(12) United States Patent
Ren et al.

(10) Patent No.: US 9,661,382 B2
(45) Date of Patent: May 23, 2017

(54) COMMERCIAL ADVERTISING PLATFORM (71) Applicant: Verizon Patent and Licensing Inc., Arlington, VA (US)

(72) Inventors: Dahai Ren, Lincoln, MA (US); Ming Chen, Bedford, MA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 0 days.

(21) Appl. No.: 14/451,490

(22) Filed: Aug. 5, 2014

(65) Prior Publication Data

US 2016/0044374 A1 Feb. 11, 2016

(51) Int. Cl.
| | |
|---|---|
| *H04N 7/025* | (2006.01) |
| *H04N 21/44* | (2011.01) |
| *H04L 29/06* | (2006.01) |
| *H04N 21/45* | (2011.01) |
| *H04N 21/458* | (2011.01) |
| *H04N 21/475* | (2011.01) |
| *H04N 21/81* | (2011.01) |
| *H04N 21/643* | (2011.01) |
| *H04N 21/2225* | (2011.01) |
| *H04N 21/472* | (2011.01) |
| *H04N 21/61* | (2011.01) |
| *H04N 21/20* | (2011.01) |

(52) U.S. Cl.
CPC ....... *H04N 21/44016* (2013.01); *H04L 65/60* (2013.01); *H04N 21/2225* (2013.01); *H04N 21/458* (2013.01); *H04N 21/4532* (2013.01); *H04N 21/4755* (2013.01); *H04N 21/47202* (2013.01); *H04N 21/6125* (2013.01); *H04N 21/64322* (2013.01); *H04N 21/812* (2013.01); *H04N 2021/225* (2013.01)

(58) Field of Classification Search
CPC .................................................. H04N 21/23424
See application file for complete search history.

(56) References Cited

U.S. PATENT DOCUMENTS

| | | | | |
|---|---|---|---|---|
| 8,583,484 | B1* | 11/2013 | Chalawsky | H04N 21/23424 705/14.43 |
| 2002/0108124 | A1* | 8/2002 | Sato | G06Q 40/04 725/136 |
| 2005/0273803 | A1* | 12/2005 | Takagi | G06Q 30/0283 725/23 |
| 2006/0294538 | A1* | 12/2006 | Li | H04N 7/17318 725/24 |
| 2007/0061363 | A1* | 3/2007 | Ramer | G06Q 30/02 |

(Continued)

*Primary Examiner* — Pankaj Kumar
*Assistant Examiner* — Timothy Newlin (57) ABSTRACT

A method includes receiving over the top streaming video content, wherein the over the top streaming video content is provided by a content provider to end users and determining at least one theme associated with the over the top streaming video content. The method also includes receiving at least one commercial advertising video clip associated with at least one commercial advertiser and mapping the at least one commercial advertising video clip to the over the top streaming video content. The method includes inserting at least one break into the over the top streaming content, and presenting the at least one commercial advertising video clip at the at least one break.

20 Claims, 9 Drawing Sheets

(56) References Cited

U.S. PATENT DOCUMENTS

| | | | |
|---|---|---|---|
| 2007/0157228 A1* | 7/2007 | Bayer | G06Q 30/02 725/34 |
| 2007/0277205 A1* | 11/2007 | Grannan | H04N 7/17309 725/80 |
| 2008/0046924 A1* | 2/2008 | Hood | G06Q 30/02 725/36 |
| 2008/0228564 A1* | 9/2008 | de Heer | G06Q 30/02 705/14.61 |
| 2008/0250449 A1* | 10/2008 | Torkos | G06Q 30/02 725/34 |
| 2009/0006191 A1* | 1/2009 | Arankalle | G06Q 30/02 705/14.71 |
| 2009/0125936 A1* | 5/2009 | Kulasekaran | H04H 60/06 725/32 |
| 2009/0222854 A1* | 9/2009 | Cansler | H04N 7/17318 725/35 |
| 2010/0077095 A1* | 3/2010 | Wong | G06Q 30/02 709/231 |
| 2013/0104159 A1* | 4/2013 | John | G06Q 30/02 725/14 |
| 2014/0115625 A1* | 4/2014 | McCoy | H04N 21/23424 725/34 |

* cited by examiner

| Break theme 1 (Peace of Mind) 810-a | Break theme 2 (Wedding) 810-b | Break theme 3 (Marriage and Children) 810-c | Break theme 4 (Misfortune) 810-d | Break theme 5 (Recovery) 810-e |

COMMERCIAL ADVERTISING PLATFORM

BACKGROUND

Streaming content providers deliver video content (e.g., movies and TV programs) over the Internet to customers via over the top streaming (i.e., without a video service provider being involved in the control or distribution of the video content). Video service providers are often unable to profit from the over the top streaming because movies and TV programs are strictly regulated by content providers (e.g., cable networks) or content creators (e.g., studios). Thus, the current rules for monetization of over the top streaming guarantees a profit for content providers but eliminates profit for others in the distribution chain.

Video service providers manage relationships with their customers using customer accounts that correspond to multiple services. The multiple services and programs often include cable television, network television, and video-on-demand content. Video service providers may track the services and programs customers receive for programming, marketing and recommendation purposes.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may aggregate and categorize commercial video clips from channels and resources associated with commercial advertisers on a platform basis and present the video clips within over the top streaming video content. The systems may present the video clips within predetermined schedules to the end users based on predetermined rules. The predetermined rules may be determined based on input from both buyer/customer/end user and seller/advertiser. The systems and methods may provide an alternative path for video service providers to profit from over the top streaming via broader content delivery (e.g., commercial advertisements, supplemental content, etc.) other than movie and TV programs.

Consistent with embodiments, the systems and methods may allow commercial advertisers to bid for priority in placement of advertisements within over the top streaming content (with regard to advertisements from other commercial advertisers). Higher priority may guarantee larger viewership, a greater share of viewers in a premium demographic, premium time placement, etc. The systems and methods may weigh the relevancy of the commercial video to the projected interests of end users. The systems and methods may also provide a capability to predict the current interests (e.g., wants, needs, etc.) of established users (e.g., based on information in customer accounts or account profiles).

Consistent with embodiments, the systems and methods may also weigh the relevancy of the commercial video to the chapter of movie being played. Different chapters may be mapped to different categories of advertisement. The systems and methods may provide a variety of schedules of commercial videos to the end user so that the end user may choose a preferred schedule among different options to deliver commercial advertisements in conjunction with over the top streaming content.

As used herein, the terms "user," "end user," "consumer," "buyer," "subscriber," and/or "customer" may be used interchangeably. Also, the terms "user," "end user," "consumer," "buyer," "subscriber," and/or "customer" are intended to be broadly interpreted to include a user device or a user of a user device.

Figure 1:
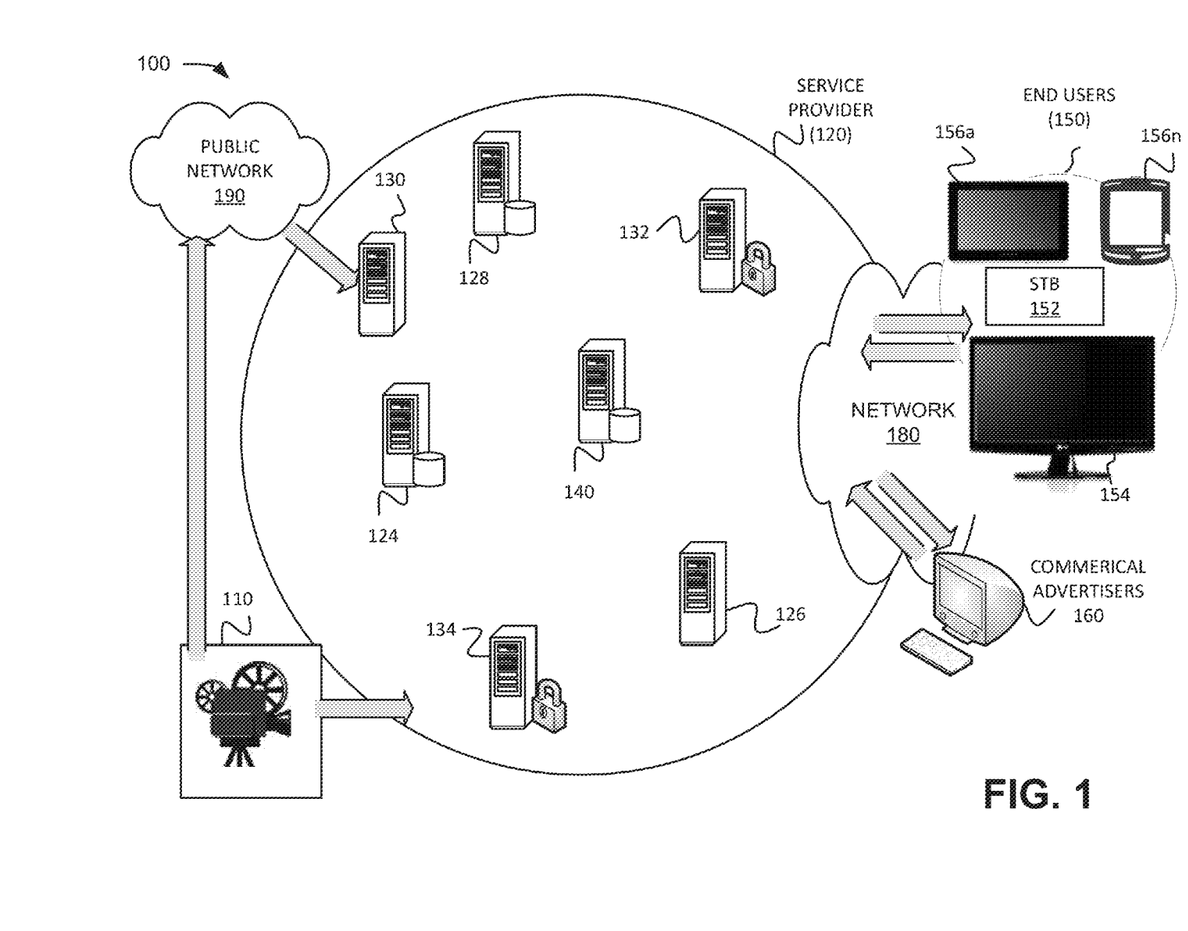
FIG. 1 illustrates an exemplary environment in which systems and methods described herein may be implemented.

FIG. 1 illustrates an exemplary environment 100 in which systems and/or methods described herein may be implemented. As shown in FIG. 1, environment 100 may include a content provider 110, a service provider network 120, end users 150, commercial advertisers 160, an access network 180, and a public network 190. Service provider network 120 may include a content processing system 124, a content delivery system 126, a search server 128, a guide server 130, an application server 132, a profile server 134, and a commercial advertising server 140. End users may include a set top box (STB 152), a television 154 and various user devices 156a-156n (collectively referred to as user devices 156 and individually as user device 156). Devices and/or networks of FIG. 1 may be connected via wired and/or wireless connections.

Content provider 110 may include one or more providers of video content. For example, content provider 110 may include a television network broadcaster, a cable television station, a film distributor, etc. Content provider 110 may provide video content to content processing system 124 in a variety of signals and formats, such as a baseband video signal, MPEG video, etc. Content provider 110 may be a provider of over the top streaming video content (i.e., via the Internet) to end users that receive Internet service via service provider network 120. Video content may include, for example, encoded video content in any of a variety of formats, including, for example, Multiview Video Coding (MVC), Moving Picture Experts Group (MPEG)-2 TS, MPEG-4 advanced video coding (AVC)/H.264.

Service provider network 120 may provide Internet services to end users/customers and may also collect, generate, and provide video content to subscribers/recipients of a video service.

Content processing system 124 may store and process video content. The content may include movies and television shows as well as "stand-alone" video clips or commercial advertisements. Content processing system 124 may encode video content using, for example, public/private keys. Content processing system 124 may also transcode the video content. Content processing system 124 may store video content in an encrypted and/or encoded form. In some implementations, content processing system 124 may index and provide metadata for video content received/transmitted from content provider 110.

Content delivery system 126 may provide video content, instructions, and/or other information to end users 150. In one implementation, content delivery system 126 may provide broadcast video content via a quadrature amplitude modulation (QAM) based system. In other implementations, content delivery system 126 may provide video content via adaptive coding modulation (ACM).

Content delivery system 126 may temporarily store and provide content requested by user device 156. In one implementation, access to content delivery system 126 (e.g., user device 156) may be restricted by a service provider that operates content delivery system 126. For example, access to content delivery system 126 may be restricted to particular users with particular subscription packages and enforced by, for example, password protection, device identifiers (for user devices 156a-156n), and/or application identifiers (e.g., residing on user devices 156a-156n). Content delivery system 126 may include other devices (not shown), such as a content server, a policy management server, a webserver, a license server, a streaming device, a router, a content cache, etc.

Search server 128 may provide support for a video search function (executed by STBs 152, televisions 154, one or more user devices 156, etc.), for searching among video content that may be provided to subscribers by content delivery system 126, and/or video content that may be provided by an associated external network, such as the Internet. The video content may be provided via Internet streams (i.e., via an over the top streaming service).

Guide server 130 may provide a commercial advertisement enabled video guide to subscribers. The commercial advertisement enabled video guide may include video content from content providers 110 and service provider network 120 that may be delivered via the Internet. The commercial advertisement enabled video guide may provide listings of channels, viewing times, descriptions of video content, access restrictions, payment requirements, etc. Guide server 130 may integrate scheduling functionality to adjust the run time of programs based on a number of advertisement breaks associated with a commercial advertisement schedule selected by a particular end user, as described herein below with respect to FIG. 6 and scheduling module 350. For example, the listed run time may incorporate the run time of the advertisements associated with a particular commercial advertisement schedule.

Application server 132 may provide one or more applications that may allow subscribers to integrate commercial advertisement applications with over the top streaming applications and content. In some implementations, application server 132 may also allow the end user to browse, purchase, rent, subscribe, and/or view video content. Application server 132 may authenticate a user who desires to purchase, rent, or subscribe to video content. In one implementation, application server 132 may interact with STB 152 or user device 156 using the hypertext transfer protocol (HTTP) or the secure HTTP (HTTPS). In another implementation, application server 132, STB 152 and user device 156 may interact with one another using another type of protocol.

Profile server 134 may store profile information relating to users (e.g., users of user devices 156). The user profile information may include previous commercial advertisement video preferences. The user profile information may also include login information (e.g., a user identifier and a password), targetable information associated with the user (e.g., types of products purchased by the user, income of the user, household characteristics, etc.), demographic information, billing information, address information (including zip codes), types of services to which the user has subscribed, a list of video content purchased by the user, a list of video content rented by the user, a list of channels or video content to which the user has subscribed, a list of users associated with the user account, ratings of video content by the user, a user device identifier (e.g., a media player identifier, a mobile device identifier, a set top box identifier, a personal computer identifier) for devices, such as STB 152, user device 156, etc.

Commercial advertising server 140 may aggregate and categorize commercial video clips from channels and resources associated with commercial advertisers on a platform basis and present the commercial advertisements to the end users based on predetermined rules in association with (or slotted into) over the top streaming content, such as described below with respect to FIGS. 3 to 9. The predetermined rules may be determined based on inputs from both buyer/customer/end user (via end user devices 150) and seller/advertiser (via commercial advertiser devices 160). Commercial advertising server 140 may provide an alternative path for video service providers to profit from over the top streaming via broader content delivery (e.g., commercial advertisements, supplemental content, etc.) other than movie and TV programs.

End user devices may include STB 152, television 154 and/or user devices 156. Different types of end users (or buyers of over the top streaming content and associated commercial advertisement) may be categorized based on established users, user profiles, user selected categories, new users, etc. STB 152 may deliver video service provided by service provider network 120 that is displayed via TV 154. User device 156 may include any device capable of communicating via a network access network 180 (and/or a home network). User device 156 may include an interactive client interface, such as a graphic user interface (GUI). User device 156 may include digital rights management (DRM) functionality to retrieve security information (e.g., decryption keys) and decrypt protected content received from content delivery system 126. Examples of user device 156 may include a mobile phone, a tablet, a personal computer, or another device that may receive video program related items, such as video program related applications and video program related content, and provide the video program related items at user device 156.

Commercial advertiser 160 may include any device capable of communicating with devices in service provider network 120 (and in particular commercial advertising server 140) via a network, such as access network 180. Commercial advertiser 160 may be a seller that advertises products and services for sale via the video clips. The video clips may include multimedia functionality that allows buyers or end users to access additional content or features associated with the advertiser (e.g., a uniform resource locator (URL), a website or advertiser specific applications). Commercial advertisers 160 may interface with service provider network 120 and participate in a bidding process for placement of commercial advertisements with end users and over the top video content. Commercial advertiser 160 may sponsor content delivery services in association with service provider network 120 (e.g., data allotments, access to video content, etc.).

Access network 180 may provide customers with multimedia content from (e.g., from content delivery system 126).

Access network 180 may include a local area network (LAN), a wide area network (WAN), such as a cellular network, a satellite network, a fiber optic network, a private WAN, or a combination of the Internet and a private WAN, etc. that is used to transport data.

Public network 190 may include a WAN, an intranet, a telephone network (e.g., the Public Switched Telephone Network), or a combination of networks. Public network 190 may include, for example, an untrusted network, such as the Internet. Public network 190 may further include network devices such as routers, switches, and/or firewalls.

While FIG. 1 shows a particular number and arrangement of networks and/or devices, in practice, environment 100 may include additional networks/devices, fewer networks/devices, different networks/devices, or differently arranged networks/devices than are shown in FIG. 1. For example, content delivery system 126 may be implemented as multiple devices.

In implementations described herein, systems may provide a video advertisement platform for distribution of content to end users, including by over the top streaming. Commercial video clips from different channels and resources may be aggregated and categorized by the platform and finally presented to the end users in conjunction with over the top streaming content based on predetermined rules. The systems and methods may enable end users (viewers) to view the service provider as a streaming content provider via a video advertisement platform from which the end user may select how advertisements are provided.

Figure 2:
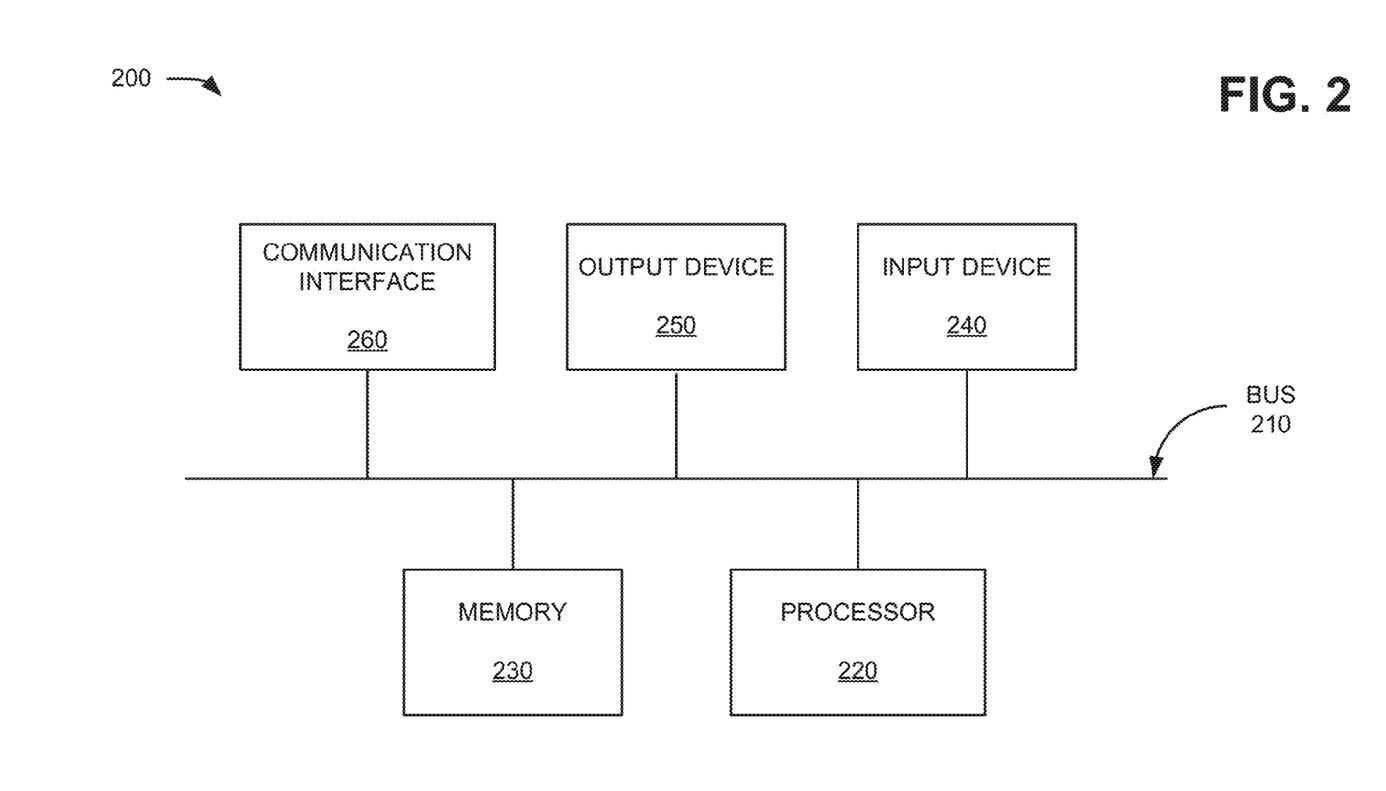
FIG. 2 illustrates an exemplary configuration of one or more of the components of FIG. 1.

FIG. 2 is a diagram of example components of a device 200. Each of content provider 110, content processing system 124, content delivery system 126, search server 128, guide server 130, application server 132, profile server 134, commercial advertising server 140, end user devices 150 and/or commercial advertiser device 160, may include one or more devices 200. As shown in FIG. 2, device 200 may include a bus 210, a processor 220, a memory 230, an input device 240, an output device 250, and a communication interface 260.

Bus 210 may permit communication among the components of device 200. Processor 220 may include one or more processors or microprocessors that interpret and execute instructions. In other implementations, processor 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processor 220, a read only memory (ROM) or another type of static storage device that stores static information and instructions for the processor 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of environment 100.

As described herein, device 200 may perform certain operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
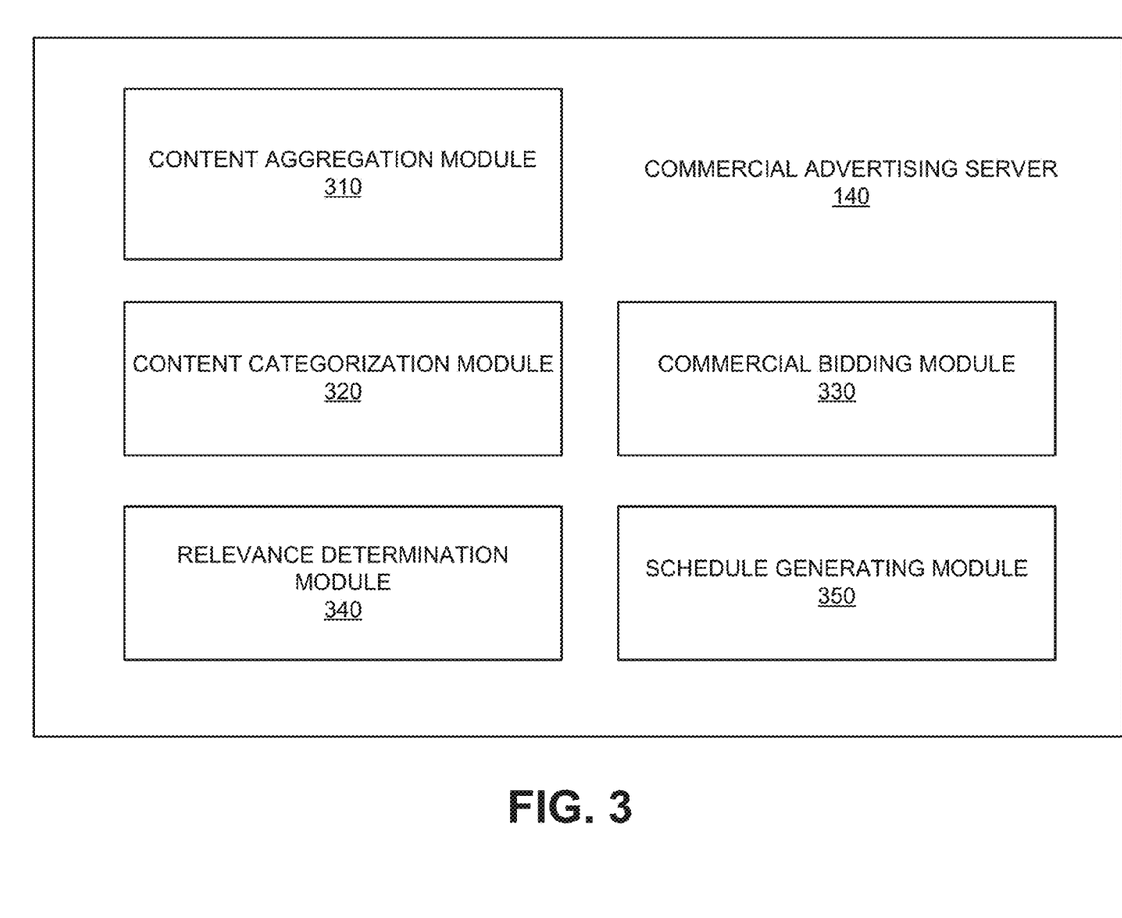
FIG. 3 is a diagram of exemplary functional components of the commercial advertising server of FIG. 1.

FIG. 3 is a diagram of exemplary functional components of commercial advertising server 140. In one implementation, the functions described in connection with FIG. 3 may be performed by one or more components of device 200 (FIG. 2). As shown in FIG. 3, commercial advertising server 140 may include a content aggregation module 310, a content categorization module 320, a commercial bidding module 330, a relevance determination module 340 and a schedule generating module 350.

Content aggregation module 310 may aggregate commercial advertisements (e.g., video clips) and information associated with commercial advertisements across a variety of platforms, formats and compatible with different devices. Content aggregation module 310 may interface with commercial advertisers 160 and receive and store commercial advertisement video clips. Content aggregation module 310 may also aggregate metadata and other information associated with over the top streaming video content provided to end users 150 by content provider 110 (e.g., outside the service provider network 120). The information may include descriptions of available video content, formats, platform availability, etc.

Content aggregation module 310 may aggregate applications and information required to distribute advertisements in conjunction with service provider network 120 in an over the top streaming environment that includes content providers 160. Content aggregation module 310 may support a cloud based commercial advertisement interface that allows commercial advertisers 160 to upload and store commercial advertisement videos to be deployed along with over the top streaming video content.

Content categorization module 320 may categorize over the top streaming video content and commercial advertisement videos. Content categorization module 320 may allow content advertisers 160 to sponsor content cost and data charges for end users 150. Content categorization module 320 may categorize, catalog and map video content and commercial videos based on chapters of the video content and themes associated with the video content and commercial videos.

Commercial bidding module 330 may allow commercial advertisers 160 to bid for priority in the placement of commercial advertisement videos within over the top streaming content, such as described below with respect to FIG. 4. Commercial bidding module 330 may receive bids and assign a higher priority to higher bids. In some instances, higher priority may guarantee larger viewership. In other instances, a higher priority may guarantee a greater share of viewers in a premium segment of end users (e.g., geographic, demographic, income, service receiving, etc.), premium time placement or a combination of other positive qualities or factors associated with end users by commercial advertisers 160.

Relevance determination module 340 may determine the relevancy of the commercial advertisement video to a viewing factor associated with viewing of the over the top streaming video content, such as described below with respect to FIG. 5. For example, relevance determination module 340 may weigh the relevancy of the commercial advertisement video to the interests (or needs) of the end user (that views the over the top streaming video content). Relevance determination module 340 may weigh the relevancy of the commercial video to a particular chapter of the over the top streaming video content (e.g., a movie) being played.

Schedule generating module 330 may provide a variety of schedules of commercial advertisement videos to end users so that the end users may select a preferred schedule among different options, as described herein below with respect to FIG. 6. The schedules may provide different combinations of numbers, types and arrangements of commercial advertisement videos that may be played at corresponding break points within the over the top streaming content selected by the end user.

Figure 4:
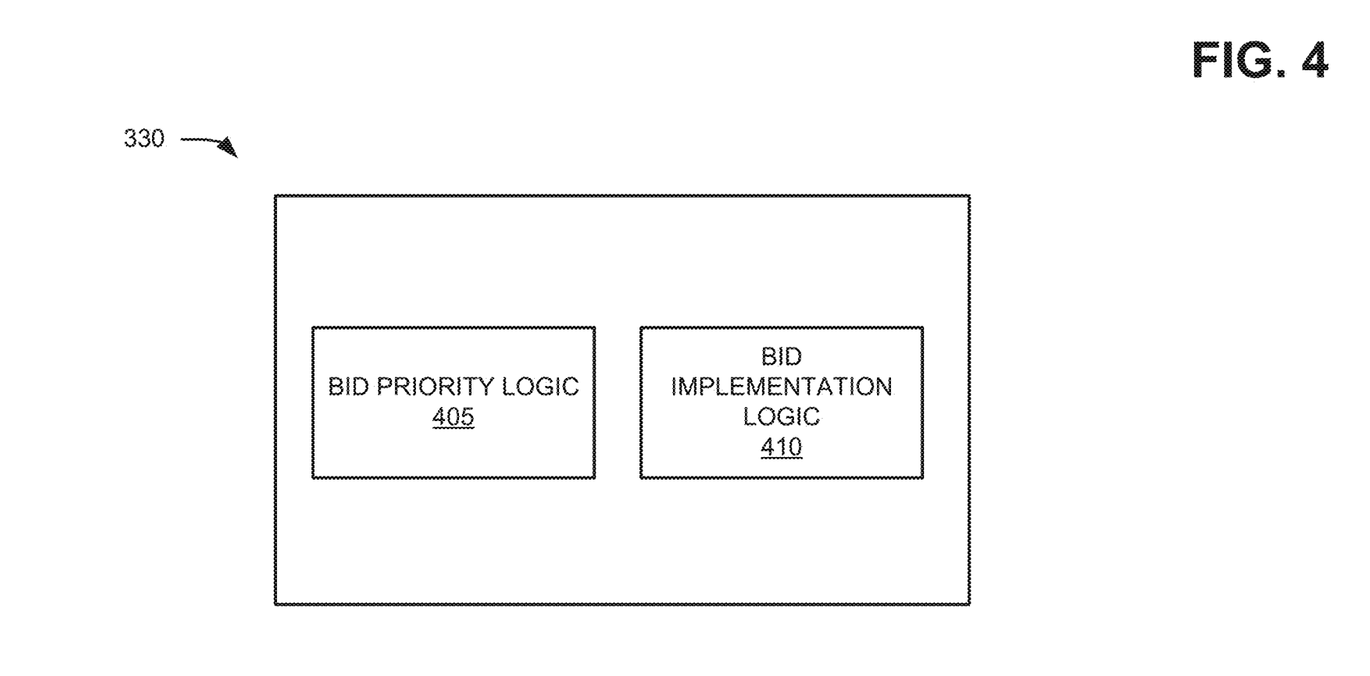
FIG. 4 depicts a functional block diagram of the bidding module of FIG. 3.

FIG. 4 is an exemplary functional block diagram of commercial bidding module 330. As shown in FIG. 4, commercial bidding module 330 may include bid priority logic 405 and bid implementation logic 410.

Bid priority logic 405 may interface with and receive bids from different commercial advertisers 160. Bid priority logic 405 may receive bids from multiple commercial advertisers 160 for a same slot in a schedule associated with particular over the top streaming video content. Bid priority logic 405 may allow the seller to bid for priority. Higher priority may guarantee larger viewership or placement of commercial advertisements in over the top streaming of end users 150 with combination of other positive qualities or factors associated with end users 150 by commercial advertisers 160. For instance, the advertising spending of a first commercial advertiser 160 for a particular category (e.g., home improvement) may be twice the level of a second commercial advertiser 160 for the same particular category in a specific region. Bid priority logic 405 may place the commercial video clip at the break of the over the top streaming video content based on a relative level (with respect to other bids) associated with the bid.

Bid priority logic 405 may determine that the probability of presenting an advertisement from the first commercial advertiser 160 is two times as high as the probability of presenting an advertisement from the second commercial advertiser 160 to the viewers in that region. In other words, the placement of the advertisements may be directly proportional to the relative sizes of the bids received. The probability of presenting a particular commercial video clip associated with a particular commercial advertiser may be directly proportional to the relative level of bids from the commercial advertisers in that category.

Bid implementation logic 410 may assist in the implementation of bids for different commercial advertisers 160. For example, bid implementation logic 410 may place bids based on a standing order (e.g., increase bid up to a predetermined amount for particular region to maintain a percentage of that region) or a predefined routine to generate bids (e.g., place a bid periodically). Bid implementation logic 410 may provide active tracking of bidding for particular time slots and/or groups of end users 150 and inform the bidding commercial advertisers 160 of the status of their bids.

Figure 5:
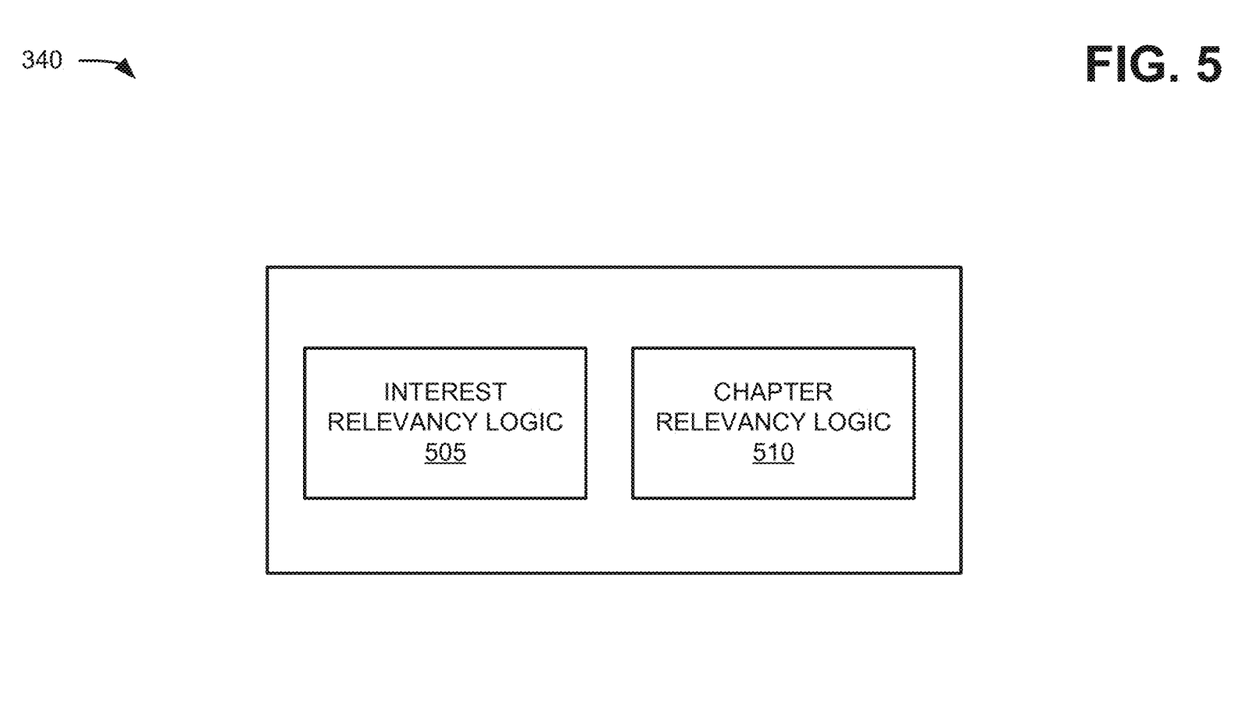
FIG. 5 depicts a functional block diagram of the relevance determination module of FIG. 3.

FIG. 5 is an exemplary functional block diagram of relevance determination module 340. As shown in FIG. 5, relevance determination module 340 may include interest relevancy logic 505 and chapter relevancy logic 510.

Interest relevancy logic 505 may weigh the relevancy of the commercial video to interests of end users 150. Interest relevancy logic 505 may predict the current interests of established users. For example, interest relevancy logic 505 may analyze the viewing habits, user profile or other indicators of likely interest generated by the end user 160 or group of end users 160. Interest relevancy logic 505 may determine the interests of the end users 160 based on these factors and compare the interests to different available commercial advertisements to determine the relevancy of each commercial video clip to the interests of the end user 150. Interest relevancy logic 505 may present personalized advertisements to established users based on their past consumption histories or/and the histories of other users with similar profiles. Interest relevancy logic 505 may provide a rule that commercial advertisements are to be provided based on general popularity for cold start users (i.e., users without a pre-existing consumption profile or history). Interest relevancy logic 505 may present popular seasonal advertisements to the cold start users.

Chapter relevancy logic 510 may weigh the relevancy of commercial video clips to the particular chapters of the over the top streaming video content (e.g., a movie) being played. Chapter relevancy logic 510 may determine different categories of advertisements based on metadata included with the commercial advertisements provided by the commercial advertisers 160. Alternatively, chapter relevancy logic 510 may apply analysis of the commercial advertisements based on predetermined categories (or a categorization system) to determine categories for the commercial advertisement clips. Chapter relevancy logic 510 may map different chapters to different categories of advertisements. Chapter relevancy logic 510 may enforce a rule that the character (or theme, etc.) of the inserted advertisement matches the character the chapter being played. Chapter relevancy logic 510 may set a predetermined threshold level of matching theme based on a numerical evaluation of the character of the commercial advertisement. For example, chapter relevancy logic 510 may assign a numerical value to each chapter based on the appearance of particular objects in the chapter, the length of time of the appearance, the centrality of the object to the segment, etc.

Figure 6:
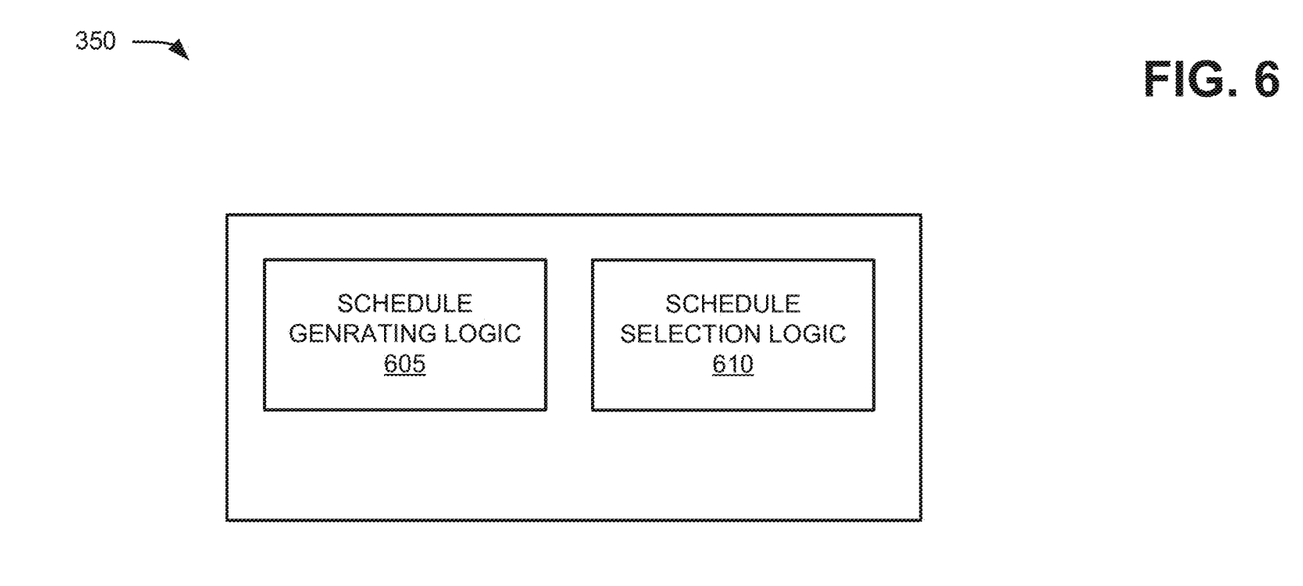
FIG. 6 depicts a functional block diagram of the schedule generating module of FIG. 3.
Figures 7A, 7B:
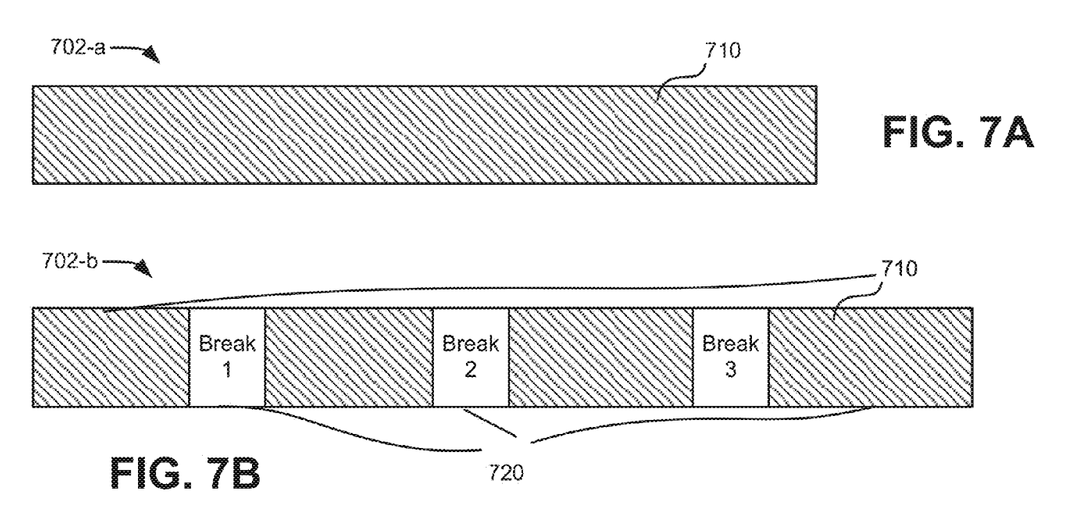
FIGS. 7A-7C depict scheduling associated with over the top streaming video content.
Figure 7C:
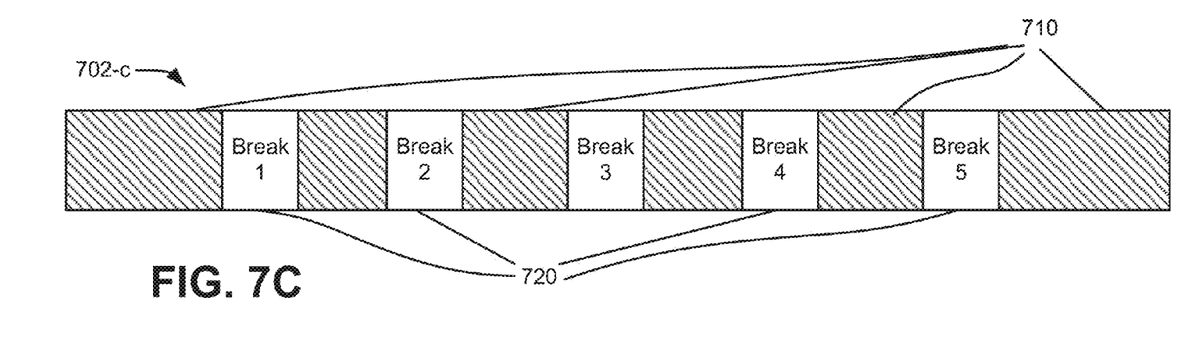
Figure 8:
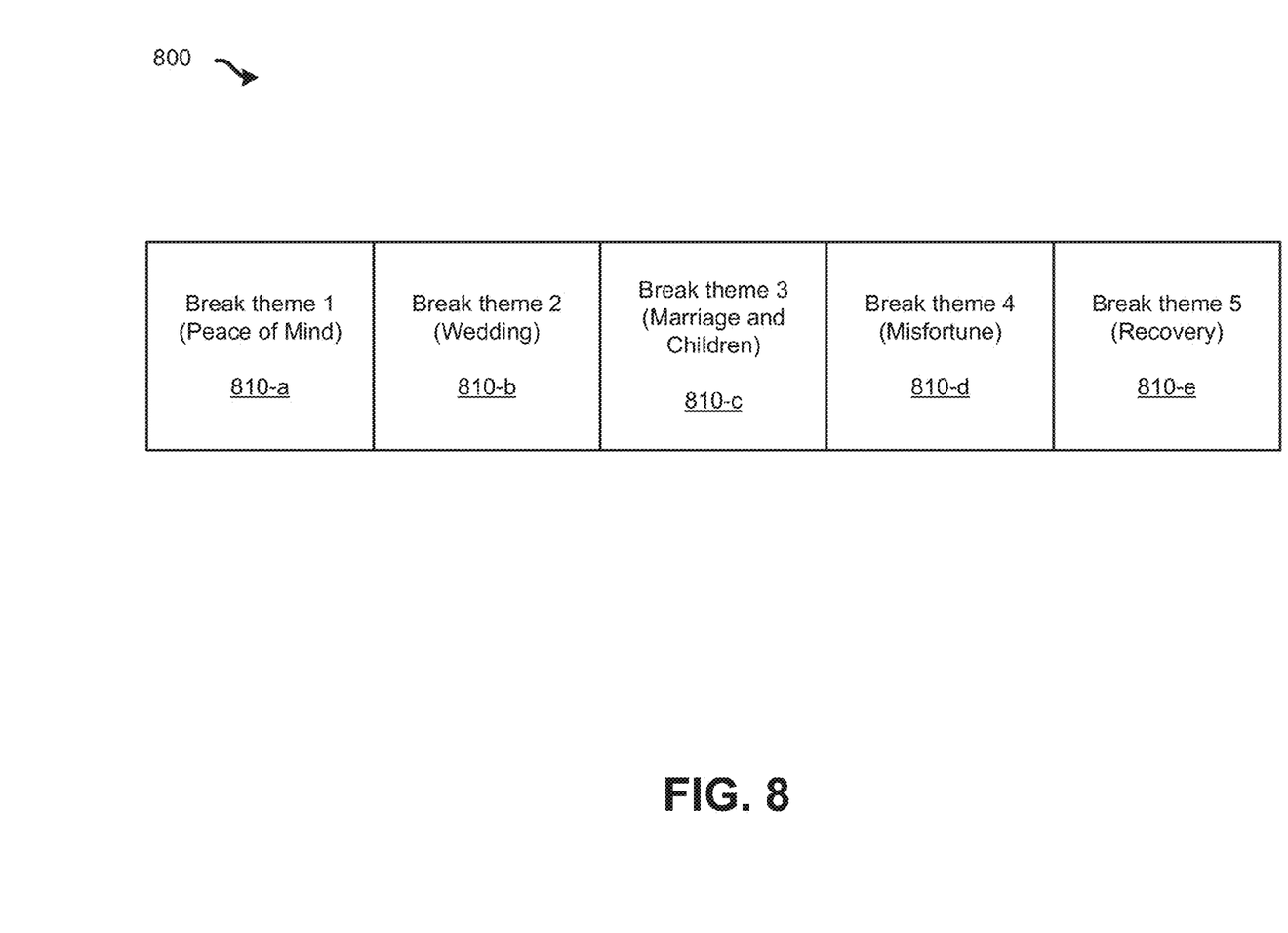
FIG. 8 depicts a theme selection table.

FIG. 6 is an exemplary functional block diagram of schedule generating module 350. As shown in FIG. 6, schedule generating module 350 may include schedule generating logic 605 and schedule selection logic 610. Schedule generating module 350 may generate schedules 700, such as shown in FIGS. 7A-7C, based on predetermined themes 800, as shown in FIG. 8.

Schedule generating logic 605 may receive video content that is scheduled to be distributed via over the top streaming to end users 150. Schedule generating logic 605 may insert multiple breaks into the scheduled video content (or alternatively schedule breaks for the video content to be interjected into the video content). Schedule generating logic 605 may generate different combinations of breaks corresponding to different schedules for the same over the top streaming video content.

Schedule generating logic 605 may generate and link schedules with over the top streaming video content 710. For example, schedule generating logic 605 may generate and link three schedules 702-a, 702-b and 702-c with a movie 710, such as shown in FIGS. 7A-7C. In schedule 7A, no advertisement is inserted into the scheduled over the top streaming video content (e.g., a movie) 710. In schedule 7B, three breaks 720 are inserted into the movie 710. Schedule generating logic 605 may insert commercial advertisement video clips at 5 break points 720 of the movie 710 in FIG. 7C. The break points 720 may be inserted at logical break points in the movie 710 based on chapters, scene changes, etc. The number and running time of advertisements at each break may be approximately the same so that an increase in break points 720 corresponds to an increase in the running time of commercial video clips within the over the top streaming video content 710.

Schedule selection logic 610 may provide a variety of schedules of commercial videos to end users 150 so that end users 150 may select a preferred schedule from among different options. The cost of watching a movie 710 may have an inverse relationship to the number of the break points 720 where advertisements are inserted. Schedule selection logic 610 may offer the end user options to choose advertisement based on different schedules and different themes as shown in FIG. 8. Schedule selection logic 610 may offer a dynamic user selected schedule in which the user may select a particular theme (or a demographic, lifestyle, etc.) for each break point 720.

According to one embodiment, the end user may select a particular movie (online streaming video content) 710 to view on a platform associated with the service provider. The user may be presented with options on how commercial advertisements are inserted into the movie 710. Popular seasonal advertisements may be inserted with consideration of both commercial advertiser's bidding prices and the relevancy of the movie chapter being played.

Alternatively, personalized advertisements may be inserted with consideration of both commercial advertiser's bidding prices and the relevancy of the movie chapter being played. The commercial advertising video clip may be dynamically based on the end user (e.g., based on a user profile, consumption history, etc.). Alternatively, schedule selection logic 610 may select the commercial advertising video clip dynamically based on an attribute associated with commercial advertising video clip (e.g., a particular type of advertisement) and a bid presented by the commercial advertiser. Schedule selection logic 610 may select the commercial advertising video clip based on this information associated with the end user. Schedule selection logic 610 may select the commercial advertising video clip dynamically based on the category of the commercial advertiser (and/or the commercial video clip) or a combination of the end user and commercial advertiser.

Alternatively, the user may be given an interactive option, such as a click down or drop down menu for each break point. A category window may be presented (e.g., the window may "pop up"). The user may select a category that is of greatest interests to the user. Categories may include goods and services provided by the commercial advertisers such as home and garden, movies and TV programs, sporting goods, automobiles, books, appliances, healthcare furniture, baby and toys, insurance, etc. The user may select one or more categories from particular categories provided at in association with each break or with the entire video content (in which instance schedule selection logic 610 may provide advertisements based on a category that most closely fits a local theme).

Figure 9:
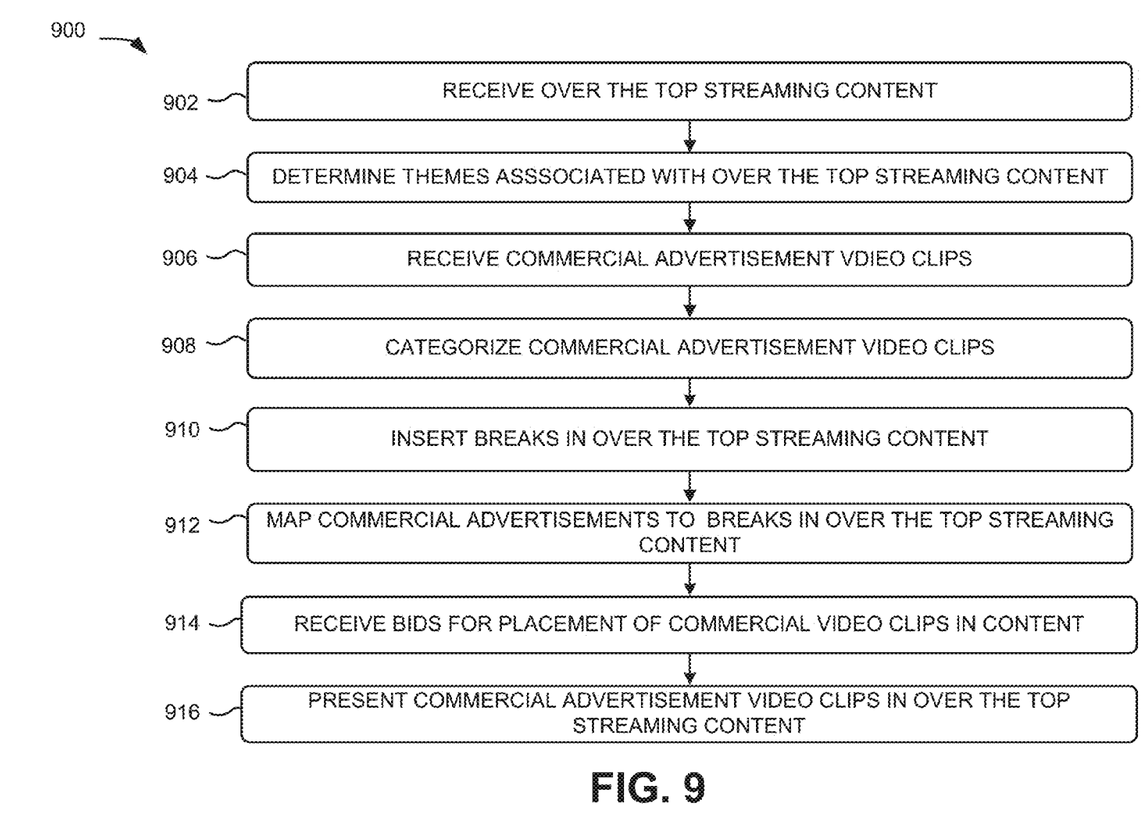
FIG. 9 is a flowchart of an exemplary process for providing advertisements based on input from end users and advertisers.

The local themes of movie sections/chapters separated by commercial breaks may be characterized based on an analysis of the video content or metadata associated with the chapters of the video content. Schedule selection logic 610 may provide an assumption that each exemplary category is equally popular. Exemplary break themes 810-a to 810-e (collectively referred to as break themes 810) are shown in FIG. 8 (e.g., break theme 1 (810-a) is Peace of Mind, break theme 2 (810-b) is Wedding, etc.). Schedule selection logic 610 may automatically select categories selected by the end user that correspond to break point themes 810 and present the commercial advertisements associated with the highest bid at that break point. For example, the category of healthcare may be presented at the fourth break point (break theme misfortune). FIG. 9 is a flowchart of an exemplary process 900 for providing advertisements based on input from end users 150 and commercial advertisers 160. Process 900 may execute in commercial advertising server 140. In another implementation, some or all of process 900 may be performed by another device or group of devices, including or excluding commercial advertising server 140. It should be apparent that the process discussed below with respect to FIG. 9 represents a generalized illustration and that blocks/steps may be added or existing blocks/steps may be removed, modified or rearranged without departing from the scope of process 900.

At block 902, commercial advertising server 140 may receive over the top streaming video content. For example, commercial advertising server 140 may receive the over the top streaming video content from a partner entity of the service provider. Alternatively, commercial advertising server 140 may receive notification of available over the top streaming video content associated with a content provider and independently access (or procure) the available over the top streaming video content.

At block 904, commercial advertising server 140 may determine themes associated with the over the top streaming video content. For example, commercial advertising server 140 may analyze sections of the over the top streaming video content based on metadata associated with the content, dialogue, situations, objects in the segments, supplemental sources of commentary, etc. Commercial advertising server 140 may determine themes based on a combination of these factors associated with the over the top streaming video content.

Commercial advertising server 140 may receive commercial advertisement video clips from commercial advertisers 160 (block 906). For example, commercial advertising server 140 may receive the commercial video clips uploaded to a cloud space or web site associated with commercial advertising server 140.

Commercial advertising server 140 may categorize the commercial advertising video clips (block 908). For example, commercial advertising server 140 may receive categories associated with the commercial video clips from the commercial advertiser 160 or alternatively analyze the commercial video clips to determine the categories associated with the video clips.

Commercial advertising server 140 may insert breaks in the over the top streaming video content (block 910). In some embodiments, the breaks may be distributed approximately evenly at logical break points throughout the over the top streaming video content.

Commercial advertising server 140 may map commercial advertisements to breaks in the over the top streaming video content (block 912). For example, commercial advertising server 140 may determine similarities between the themes of the break (and corresponding segments) of the over the top streaming video content and categories associated with the commercial advertisement video clips.

At block 914, commercial advertising server 140 may receive bids for placement of commercial video clips on the over the top streaming video content. For example, commercial advertising server 140 may receive the bids from multiple commercial advertisers for placement of commercial advertisements based on categories, types of over the top streaming video content (e.g., genre, rating, etc.), end user groups, etc.

At block 916, commercial advertising server 140 may present the commercial video clips in the over the top streaming video content to the requesting end user. Commercial advertising server 140 may present the commercial video clips in the over the top streaming video content in a personalized manner, such as described herein above with respect to FIGS. 6-8.

Systems and/or methods described herein may categorize and map commercial video advertisements to over the top streaming content. The systems may allow personalized delivery of the commercial advertisements in the over the top streaming video content. The systems may enlarge/expand the food chain of content delivery. The systems may enable service providers to generate video revenues indirectly from a video advertisement platform rather than from (or in addition to) movies and TV programs directly.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 9, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the embodiments unless explicitly described as such. Also, as used herein, the articles "a", "an" and "the" are intended to include one or more items. Further, the phrase "based on" is intended to mean "based, at least in part, on" unless explicitly stated otherwise.

What is claimed is:

1. A computer-implemented method comprising:
   receiving over the top streaming video content, wherein the over the top streaming video content is provided by a content provider to end users;
   determining, by a processing device, at least one theme associated with the over the top streaming video content;
   receiving at least one bid for placement of at least one commercial advertising video clip associated with at least one commercial advertiser in the over the top streaming video content;
   providing active tracking of bidding for the placement of the at least one commercial advertising video clip to the at least one commercial advertiser;
   mapping the at least one commercial advertising video clip to the over the top streaming video content based on the bidding;
   inserting at least one break into the over the top streaming video content;
   determining a relative proportion of the at least one bid to a total bid for the at least one break;
   inserting the at least one commercial advertising video clip in the at least one break based on the determined relative proportion of the at least one bid; and
   presenting the at least one commercial advertising video clip at the at least one break in a percentage of a viewing region for the over the top streaming content based on the relative proportion of the at least one bid.

2. The computer-implemented method of claim 1, wherein a number of the at least one break is inversely proportional to a cost associated with the over the top streaming video content for the end users.

3. The computer-implemented method of claim 1, wherein the commercial advertising video clip is selected dynamically based on a category of the at least one commercial advertiser and a profile associated with an end user.

4. The computer-implemented method of claim 1, wherein a probability of presenting a particular commercial video clip associated with a particular commercial advertiser is directly proportional to a relative level of the bid associated with the particular commercial advertiser to bids associated with all bidders among the commercial advertisers in a category.

5. The computer-implemented method of claim 1, further comprising:
   presenting popular seasonal advertisements in the at least one break when an end user is a cold start user.

6. The computer-implemented method of claim 1, further comprising:
   providing a plurality of schedules to an end user, wherein each of the schedules includes a different number of breaks than that of other ones of the plurality of schedules; and
   receiving a selection of a particular schedule from the end user.

7. The computer-implemented method of claim 1, further comprising:
   providing a drop down menu that includes different categories associated with the at least one break; and
   receiving a selection of a particular category associated with the at least one break.

8. The computer-implemented method of claim 7, wherein the categories include at least one of home and garden, movies and TV programs, sporting goods, automobiles, books, appliances, health care or furniture.

9. The computer-implemented method of claim 1, wherein the at least one commercial advertiser comprises a plurality of commercial advertisers, the method further comprising:
providing priority to a particular commercial advertiser in a premium segment of end users based on a relative size of a bid.

10. The computer-implemented method of claim 9, wherein the premium segment of end users is based on a geographic segment.

11. The computer-implemented method of claim 9, wherein the premium segment of end users is based on a demographic segment.

12. The computer-implemented method of claim 1, wherein the premium segment of end users is based on income associated with the end users.

13. The computer-implemented method of claim 1, wherein the at least one commercial advertiser comprises a plurality of commercial advertisers, the method further comprising:
providing priority to a particular commercial advertiser in premium time segments based on a relative size of a bid.

14. A device, comprising:
a memory to store a plurality of instructions; and
a processor configured to execute the instructions in the memory to:
receive over the top streaming video content, wherein the over the top streaming video content is provided by a content provider to end users;
determine at least one theme associated with the over the top streaming video content;
receive at least one bid for placement of the at least one commercial advertising video clip associated with at least one commercial advertiser in the over the top streaming video content;
map the at least one commercial advertising video clip to the over the top streaming video content;
provide active tracking of bidding for the placement of at least one commercial advertising video clip to the at least one commercial advertiser;
insert at least one break into the over the top streaming video content;
determine a relative proportion of the at least one bid to a total bid for the at least one break;
insert the at least one commercial advertising video clip in the at least one break based on the determined relative proportion of the at least one bid; and
present the at least one commercial advertising video clip at the at least one break in a percentage of a viewing region for the over the top streaming content based on the relative proportion of the at least one bid.

15. The device of claim 14, wherein the at least one commercial advertising video clip comprises a plurality of video clips, the at least one commercial advertiser comprises a plurality of commercial advertisers and the processor is further to:
receive at least one bid for placement of at least one of the plurality of video clips from at least one of the plurality of commercial advertisers; and
place the at least one commercial video clip at the at least one break of the over the top streaming video content based on a level associated with the at least one bid.

16. The device of claim 14, wherein a number of the at least one break is inversely proportional to a cost associated with the over the top streaming video content for the end users.

17. The device of claim 14, wherein the commercial advertising video clip is selected dynamically based on a profile associated with an end user.

18. A non-transitory computer-readable medium including instructions to be executed by a processor, the instructions including one or more instructions, when executed by the processor, for causing the processor to:
receive over the top streaming video content, wherein the over the top streaming video content is provided by a content provider to end users;
determine at least one theme associated with the over the top streaming video content;
receive at least one bid for placement of at least one commercial advertising video clip associated with at least one commercial advertiser in the over the top streaming video content;
provide active tracking of bidding for the placement of the at least one commercial advertising video clip to the at least one commercial advertiser;
map the at least one commercial advertising video clip to the over the top streaming video content based on the bidding;
insert at least one break into the over the top streaming video content;
determine a relative proportion of the at least one bid to a total bid for the at least one break;
insert the at least one commercial advertising video clip in the at least one break based on the determined relative proportion of the at least one bid; and
present the at least one commercial advertising video clip at the at least one break in a percentage of a viewing region for the over the top streaming content based on the relative proportion of the at least one bid.

19. The non-transitory computer-readable medium of claim 18, wherein the one or more instructions further includes instructions for causing the processor to:
provide a variety of schedules to the end user, wherein each of the schedules includes a different number of breaks than that of other one of the schedules; and
receive a selection of a particular schedule from an end user.

20. The non-transitory computer-readable medium of claim 18, wherein the one or more instructions further includes instructions for causing the processor to:
provide a drop down menu that includes different categories associated with at least one break; and
receive a selection of a particular category associated with the at least one break.

* * * * *